United States Patent [19]
Coleman et al.

[11] Patent Number: 5,425,421
[45] Date of Patent: Jun. 20, 1995

[54] METHOD FOR SEALING UNWANTED FRACTURES IN FLUID-PRODUCING EARTH FORMATIONS

[75] Inventors: James R. Coleman; Steven D. Crane; Quintin J. Lai, all of Plano, Tex.

[73] Assignee: Atlantic Richfield Company, Los Angeles, Calif.

[21] Appl. No.: 132,002

[22] Filed: Oct. 5, 1993

[51] Int. Cl.$^6$ .................. E21B 33/138; E21B 43/26
[52] U.S. Cl. .................. 166/250; 166/294; 166/295
[58] Field of Search ............ 166/294, 295, 293, 292, 166/281, 269, 308, 250

[56] References Cited
U.S. PATENT DOCUMENTS

| | | | |
|---|---|---|---|
| 3,241,613 | 3/1966 | Kern et al. | 166/281 X |
| 3,310,110 | 3/1967 | Martin | 166/294 X |
| 3,814,187 | 6/1974 | Holman | 166/281 |
| 4,157,116 | 6/1979 | Coulter | 166/294 X |
| 4,397,353 | 8/1983 | Lacy | 166/281 |

Primary Examiner—Stephen J. Novosad
Attorney, Agent, or Firm—Michael E. Martin

[57] ABSTRACT

Hydraulic fractures which extend between a hydrocarbon fluid producing zone of an earth formation and a water-producing zone are sealed with respect to the water-producing zone by simultaneously injecting a non-sealing fluid such as crude oil, diesel fuel or brine into the portion of the fracture extending within the hydrocarbon producing zone and injecting a settable gel composition such as a polyacrylamide polymer cross-linked with inorganic transition metals into the portion of the fracture extending within the water-producing zone. The flow rates of the simultaneously pumped fluids are controlled in accordance with the ratio of the respective fracture heights and the viscosity and density of the respective sealing and non-sealing fluids. One fluid is typically pumped through the well annulus while the other fluid is pumped through a tubing string which is sealed from the annulus by a conventional packer disposed at the interface between the hydrocarbon and water-bearing zones.

10 Claims, 1 Drawing Sheet

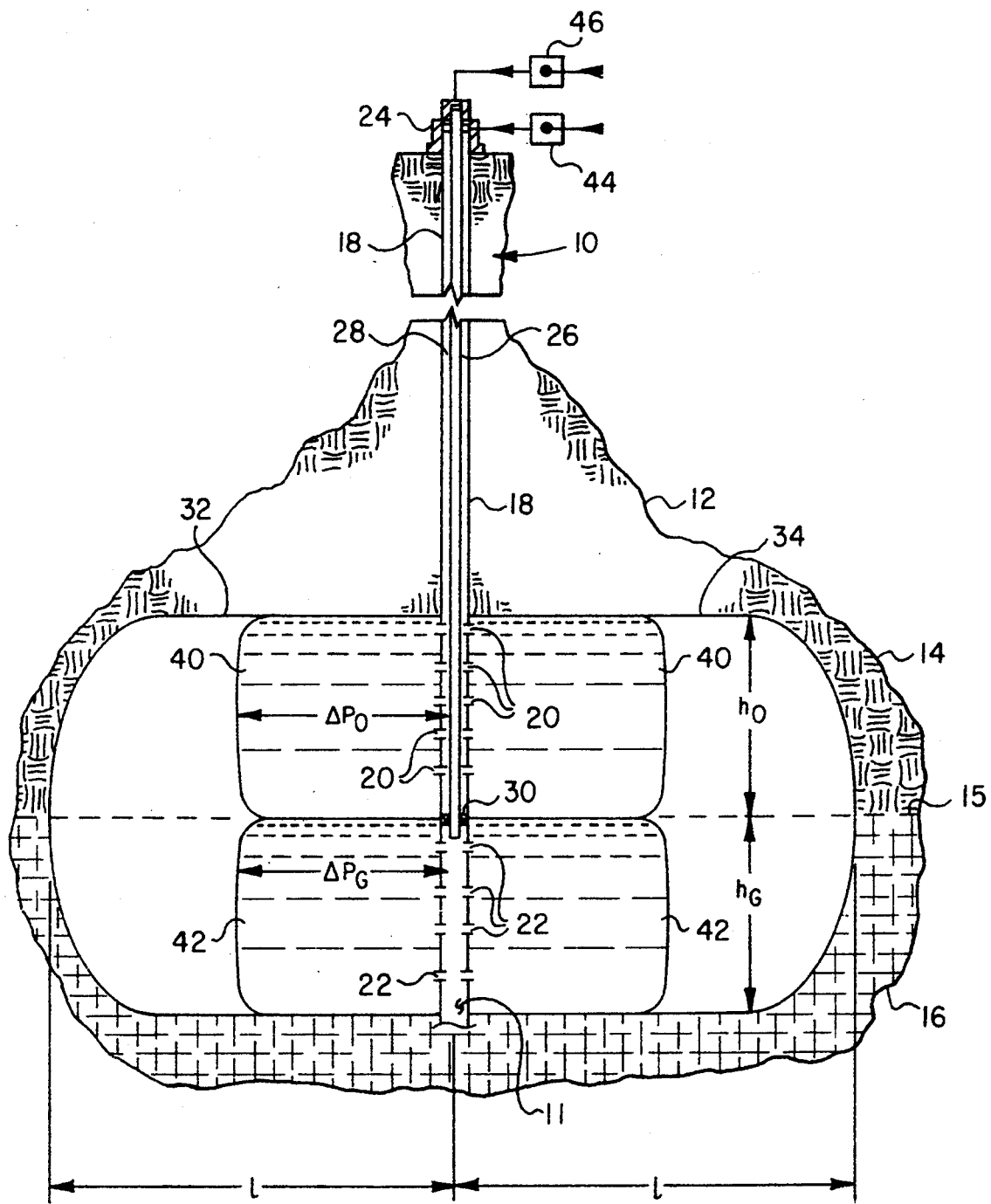

METHOD FOR SEALING UNWANTED FRACTURES IN FLUID-PRODUCING EARTH FORMATIONS

BACKGROUND OF THE INVENTION

1. Field of the Invention

The present invention pertains to a method for sealing unwanted portions of fractures in earth formations to minimize the production of water or other unwanted fluids while permitting the production of hydrocarbons or other desired fluids.

2. Background

In the production of hydrocarbons from wells extending into earth formations, a common practice to enhance production is hydraulic fracturing of the earth formation in a particular producing zone. Occasionally, hydraulic fractures will extend beyond the hydrocarbon-producing zone into water production zones, for example. This unwanted fracture growth or "out of zone fracture" can seriously affect the productivity of a well due to excess water production.

Accordingly, what is desired is to be able to seal or restrict water flow from only a portion of a hydraulic fracture or a similar fracture in the earth which extends between a hydrocarbon-producing zone and a water-producing zone. Although water flow control or permeability reducing compositions are known for injection into wells, known compositions and methods have not addressed the problem of sealing only a portion of a fracture while allowing fluids to be produced from a remaining portion of the fracture or a similar high permeability zone. It is to this end that the present invention has been developed with a view to providing an improved method for sealing unwanted fracture zones from those zones from which it is desired to produce certain fluids.

SUMMARY OF THE INVENTION

The present invention provides an improved method for controlling the production of unwanted fluids from a zone of an earth formation into a fluid-producing well.

In accordance with an important aspect of the present invention, a method is provided for sealing a portion of an earth formation from which water or other unwanted fluids are being produced and commingled with fluids which are desired to be produced, such as crude oil and natural gas. In particular, a method is provided for sealing a portion of a hydraulic fracture which extends between a formation zone of interest and an aquifer. The method provides for sealing a portion of a hydraulic fracture with a medium such as a gel composition while permitting oil or gas to be produced from or through another portion of the fracture.

The invention further contemplates a method of sealing a portion of a hydraulic fracture by simultaneously pumping a non-sealing fluid medium into a portion of the fracture which penetrates a hydrocarbon-bearing zone while pumping a sealing medium, such as a polymer gel composition, into a second portion of the fracture. The pumping rates may be carried out in relation to the viscosities and densities of the sealing and non-sealing fluid medium as well as the overall height of the fracture zone which is producing the desired formation fluid and the overall height of the fracture zone which is producing the unwanted formation fluid.

In accordance with yet a further aspect of the present invention, a portion of a hydraulic fracture is sealed by simultaneously pumping a polymer solution down through a well tubing string while a non-sealing or non-reactive fluid is pumped down the annulus of the well, or the non-reactive fluid may be pumped through the tubing string and the polymer solution through the annulus. One advantage of the invention is that a relatively easily pumped fluid, such as a cross-linkable polymer gel, may be placed into a propped fracture and then allowed to set into a stable, semi-solid material to act as a barrier or seal against further water production from the fracture. Simultaneously, the hydrocarbon-bearing zone penetrated by the fracture is kept open so that the well may continue to produce the desired fluids. The non-sealing fluid may include a quantity of gelation delaying or preventing material dispersed therein in the event that the gel composition migrates into the portion of the fracture which is desired to be maintained in a fluid-producing condition.

Those skilled in the art will recognize the above-described advantages and features of the present invention together with other superior aspects thereof upon reading the detailed description which follows in conjunction with the drawing.

BRIEF DESCRIPTION OF THE DRAWING

The drawing FIGURE is a diagram of a well penetrating a portion of an earth formation which has been hydraulically fractured and which is being treated in accordance with the method of the invention.

DESCRIPTION OF A PREFERRED EMBODIMENT

Several compositions have been developed for treating subterranean earth formations to alter the permeability of a particular zone of interest, increase the so-called sweep efficiency of a fluid injected into the formation or for substantially plugging a region in a formation. For example, gels comprised of high molecular weight water soluble acrylamide polymers together with a chromium III/carboxylate complex capable of cross-linking the polymer in a aqueous solvent are known for such processes. U.S. Pat. No. 4,683,949 to Sydansk, et al, as well as U.S. Pat. Nos. 4,724,906 to Sydansk, 4,730,675 to Wygant, et al, 4,968,442 to Falk, 5,010,954 to Falk and 5,082,057 to Sydansk describe certain gel compositions which are utilized in plugging or consolidating subterranean earth formations to alter the fluid flow characteristics therein. The present invention contemplates using materials of the general type described in the above-mentioned patents as well as other polymers which, when cross-linked, will form a substantially temperature stable, semi-solid gel structure. These polymer gels can also be used for certain formation plugging operations, such as of the type described in U.S. patent application Ser. No. 08/088,456 filed Jul. 7, 1993 in the name of Quintin J. Lai and Daniel P. Newhouse, and assigned to the assignee of the present invention.

This invention contemplates sealing a portion of a formation zone which is producing an unwanted fluid, such as water, into a production well which also penetrates a zone adjacent to the water-bearing zone from which it is desired to produce fluids such as crude oil. Hydraulic fracturing is a well-known technique for increasing the production of hydrocarbons from a formation zone of interest. From time to time, the process of generating or extending a hydraulic fracture will result in fracture growth out of the formation zone of interest into a formation zone, possibly above or below the zone of interest, which bears a substantial quantity of an unwanted fluid such as water. In order to maintain the well as an economic oil producer, water production must be stopped or substantially reduced. Since a hydraulic fracture extending between an oil-producing zone and a water-producing zone provides an open flow channel for producing both fluids, the problem to be solved is to seal only that portion of the fracture penetrating the formation zone which is producing the unwanted fluid.

FIG. 1 illustrates, in substantially schematic form, an oil production well 10 penetrating an earth formation 12 including an oil-producing zone 14 and an aquifer or water-producing zone 16. The well 10 is configured to include a conventional cylindrical casing 18 having a series of vertically spaced ports or perforations 20 and 22 formed therein. The well 10 includes a conventional wellhead 24 from which the casing 18 depends and also from which a tubing string 26 depends within the casing. A well annulus space 28 is defined between the wellhead 24 and a conventional retrievable packer 30, as illustrated.

The earth formation 12 is shown in a condition wherein a hydraulic fracture has been formed and which is illustrated as the somewhat idealized two-winged, vertically extending fracture configuration as defined by the fracture wings 32 and 34. Earth formations with uniform compressive stress fields may be fractured by well-known techniques to create generally two-winged, vertically extending fractures which also extend laterally out from the wellbore in opposite directions as shown by the idealized diagram of the drawing FIGURE. However, the creation of the fracture wings 32 and 34 sometimes is uncontrolled to the extent that the fracture extends vertically out of the formation zone in which it is desired to be constrained, such as the oil-bearing zone 14, across an interface 15 into a zone such as the water-producing zone 16. Typical fracture dimensions for a well of 6000 to 10,000 foot depth, which has been perforated by the perforations 20 and 22 over a 100 foot vertical depth, may be on the order of twenty feet to three hundred feet in height and 100 feet to 1,000 feet in lateral extent or length (each wing). Fractures of this configuration generally have a maximum width, viewed in a horizontal plane, of about 0.30 to 0.50 inches.

By way of example, a hydraulic fracture which has become uncontrolled to the extent that it has broken into a zone 16 and having a total vertical height of about 100 feet may, over about one-half of its height, penetrate zone 16. In some instances the water-bearing zone may be above the oil-bearing zone and for the sake of this discussion, it will be understood that the zones 14 and 16 may be reversed, that is, the oil-bearing zone may be that identified as zone 16 and the water-bearing zone identified as zone 14. Multiple water- and oil-bearing zones may be interconnected by a fracture and also treated in accordance with the present invention. Moreover, the fracture 32, 34 may extend in a direction other than substantially vertically.

In creating the fracture wings 32 and 34, in accordance with conventional practice, the fracture fluid carries a suitable proppant material into the fracture to hold it propped open when the hydraulic pressure is relieved. Accordingly, the fracture wings 32 and 34 are not completely void of material but the permeability of the fracture wings is substantially greater than the formation material which defines the opposed faces of the fracture. By way of example, a propped hydraulic fracture may have a permeability in the range of about 400 darcies with proppant in the fracture wings 32 and 34 while the formation zones 14 and 16 may have a permeability of as low as 200 millidarcies while still being capable of producing fluids into the fracture. With this substantial difference in permeability, fluids may easily flow between the formation zones 14 and 16 and the wellbore 11, but the presence of a proppant, not shown, in the fracture wings 32 and 34 will nevertheless somewhat restrict the flow and enable the injection of two different banks of fluids, designated by the numerals 40 and 42 in the drawing FIGURE, without substantial commingling of the fluids due to gravity effects, for example, if carried out in accordance with the present invention. Accordingly, it is contemplated, in accordance with the invention, that two different fluids may be simultaneously pumped into the fracture wings 32 and 34 to effect sealing of the lower portions of the fracture, which extend into the zone 16, while leaving the upper portions of the fracture, which extend within the zone 14, free to allow flow of fluids from the formation zone 14 to the well 10. By way of example, it is contemplated that a non-sealing fluid such as crude oil, diesel fuel, brine or some other fluid that would be non-damaging to the formation zone 14, may be pumped from a source, not shown, by way of a pump 44 into the well annulus 28 and through the perforations 20 into the fracture wings 32 and 34 while, simultaneously, a suitable gel composition of the type mentioned hereinbefore may be prepared and pumped through the tubing 26 by way of a pump 46 to flow into the fracture wings through the perforations 22. This simultaneous pumping of two different fluids will generate the pads or banks of fluids 40 and 42 which will flow out into the fracture wings 32 and 34 to substantially fill the fracture wings. Some portions of the fluids will, of course, permeate into the formation zones 14 and 16. The gel composition which generates the fluid banks 42 will form a stable, semi-solid material which will act as a barrier to the production of water into and through the portion of the fracture which penetrates the formation zone 16. A fluid such as crude oil, diesel fuel or even suitably treated water which has been injected to form the fluid banks 40 will, of course, be capable of flowing out of the portions of the fracture wings 32 and 34 which intersect the formation zone 14 ahead of the formation fluids themselves to prevent any reduction in permeability of the portion of the fracture penetrating the formation zone 14 so that oil and/or gas may be produced from the well 10 while substantially preventing the production of water. Once the gel banks 42 have been pumped in sufficient quantity to completely fill the fracture wings below the interface 15 and accommodate any absorption of gel composition into the formation zone 16 immediately adjacent, the fracture, the tubing string 26 and the packer 30 may be retrieved and a suitable production tubing string installed to provide for production of fluids through the perforations 20 from the formation zone 14.

In order to pump the fluid banks 40 and 42 without substantial commingling of the fluids which form these banks, suitable volume flow rates of the fluids must be determined. It is contemplated that the pressure differentials created and which extend between the well 10 and the lateral periphery of the fluid banks 40 and 42 should be maintained substantially equal if the densities of the respective fluids being injected are substantially equal. In other words, the pressure differentials or gradients $\Delta P_o$ of the non-sealing fluid banks 40 should be equal to the pressure differentials $\Delta P_G$, of the gel composition being pumped into the portion of the fracture which penetrates the formation zone 16. The heights of the portions of the fracture wings 32 and 34 which penetrate the respective zones 14 and 16 may be determined by suitable logging methods known to those skilled in the art. These heights are indicated in the drawing FIGURE as $h_O$ for the height of the fracture portion penetrating the zone 14, and $h_G$ is the height of the fracture portion penetrating the zone 16. It is assumed that the width of the fracture wings 32 and 34 is substantially constant throughout the total height of the fracture.

Accordingly, the volumetric flow rate of fluids to be injected into the fracture zones by way of the pumps 44 and 46 is determined in accordance with Darcy's law and the premise that the pressure differentials $\Delta P_o$ and $\Delta P_G$ should be equal during the treatment process. Darcy's law states that the rate at which a fluid flows through a permeable substance, such as a propped hydraulic fracture per unit area of fracture, is equal to the permeability of the substance through which the fluid is flowing multiplied by the pressure differential, $\Delta P$, per unit length of flow, divided by the viscosity of the fluid pumped. Accordingly, by setting equal the pressure differentials generated by the flow of the respective fluid banks 40 and 42, the parameters of Darcy's law which remain provide the equation:

$$\frac{Q_o \mu_o}{h_o} = \frac{Q_G \mu_G}{h_G} \quad \text{(a)}$$

where $Q_o$ equals the volumetric flow rate of the non-sealing fluid medium such as crude oil or diesel fuel, $Q_G$ is the volumetric flow rate of the gel composition, $\mu_o$ is the viscosity of the non-sealing fluid, $\mu_G$ is the viscosity of the gel composition during the pumping process, $h_O$ is the height of the fracture portion penetrating the oil-bearing zone 14 and $h_G$ is the height of the fracture penetrating the water-bearing zone 16. It is assumed that the lateral "lengths" l of the fracture wings 32 and 34 are equal as indicated. Since the heights of the fracture portions $h_O$ and $h_G$ are predetermined and the viscosities of the non-sealing fluid, $\mu_o$ and the gel composition $\mu_G$ may also be predetermined by selection of the fluids. The flow rates of each fluid may be calculated in accordance with equation (a), that is the flow rate of the non-sealing fluid may be determined in terms of the flow rate of the gel composition and vice versa. Equation (a) does not account for the effect of fluid densities for both the non-sealing fluid and the gel composition. However, at the interface between the fluid banks 40 and 42, a pressure differential may exist due to density differences between the non-sealing fluid and the gel composition which could cause invasion of one fluid into the other. The density difference between the two fluids will require an additional pressure differential due to flow losses which is necessary for a pressure differential caused by the difference in density. This is equivalent to a compensatory volumetric flow rate due to the difference in density between the two fluids. Again, using Darcy's law, the volumetric flow rate differential which must be added or subtracted to one or the other of the fluid pumping rates expressed as $Q_\rho$ is a function of the difference in densities between the non-sealing and sealing fluids and may be expressed as follows.

$$Q_\rho = -C_1 \cdot \frac{Kwl}{\mu} \cdot \Delta\rho \cdot g \quad \text{(b)}$$

where $-C_1$ is a dimensional constant, K is the permeability of the fracture, w is the width of the fracture, l is the length of the fracture, $\mu$ is the viscosity of the fluid which is either pumped at a greater rate or a lesser rate, whichever is chosen, $\Delta\rho$ is the difference in the densities of the two fluids being pumped, and g is the dimensional gravity acceleration constant.

If the fluid banks 40 and 42 do not flow out into the fracture wings 32 and 34 at a substantially equal rate and some commingling of the respective fluids takes place, unwanted plugging of the portion of the fracture penetrating the oil-bearing zone 14 may be minimized by mixing predetermined amounts of gelation delaying or preventing substances such as carboxylates into the fluid which is pumped into the portion of the fracture penetrating the zone 14.

A method of treating a subterranean earth formation to seal certain portions of the formation to prevent the production of water while allowing the desired production of hydrocarbon fluids, for example, is believed to be understandable to those of ordinary skill in the art from the foregoing description. The gel material which acts to seal the portions of a fracture penetrating a water-bearing zone may be selected from one of the above-mentioned general classes of gel compositions known to those of ordinary skill in the art in oil and gas production operations. The determination of the fracture geometry may also be accomplished by conventional logging methods and by calculations on the known stress distribution in the earth formation 12 in the vicinity of the fracture. The drawing FIGURE is intended to be a schematic diagram and the geometry of the fracture wings 32 and 34 may be somewhat different from the idealized, somewhat elliptical geometry illustrated. After determining the flow rate of the non-sealing fluid, which will be injected down through the annulus 28 and the flow rate of the gel composition to be injected through the tubing string 26, the total volume of these fluids to be pumped may be calculated from the presumed volume of the fracture wings 32 and 34 (less the volume of proppant, if any, in the fractures) and an assumed amount of penetration or permeation of these fluids into the formation zones 14 and 16 through the fracture faces. As previously mentioned, the gel composition may be required to be pumped through the annulus 28 while the non-sealing fluid is pumped through the tubing string 26 if, in fact, the oil-bearing zone is that defined by the zone 16 and the water-bearing zone is that defined by the zone 14. An example of a well treated in accordance with the present invention is as follows.

A cased well having a tubing string with a settable and releasable packer attached thereto is prepared for treatment by placing the packer at the interval between perforations extending into an oil-bearing zone and perforations extending into a water-bearing zone, wherein both zones have been fractured by a substantially vertical two-winged fracture. Prior to setting the packer, a three percent (3%) potassium chloride brine is pumped down the annnulus and injected into the formation to clean both sets of perforations. After establishing injection, the pumping is stopped momentarily and the packer is set to form a seal in the well between the oil zone perforations and the water zone perforations. At this point, injection of brine is re-established by pumping at a rate of about one barrel per minute down through the tubing string into the water-bearing zone perforations and pumping at about ten barrels per minute into the annulus and through the perforations penetrating the oil-bearing zone. Brine injection through the tubing string is then terminated into the water-bearing zone and a suitable polymer solution without a cross-linking agent is injected down through the tubing string at a rate of about 0.50 barrels per minute (42 U.S. gallon/barrel) to establish values of friction pressure losses through the tubing string.

After the polymer solution begins penetrating the formation at the water-bearing zone, injection of polymer with the cross-linking agent is initiated at a rate of 0.50 barrels per minute while maintaining injection of the three percent (3%) potassium chloride brine down through the annulus into the fracture penetrating the oil-bearing zone at a rate of about ten barrels per minute. Pressures at the perforations for both zones are, of course, maintained below the fracture initiation or extension pressure.

The ratio of pumping rates is determined in accordance with the ratio of the viscosities of the polymer solution and the potassium chloride brine. The respective heights of the portions of the fracture penetrating the oil-bearing and water-bearing zones are, in this example, substantially equal. Fluid densities are determined to be substantially equal. The total volume of polymer and cross-linker solution is estimated to be approximately three times the volume of the portion of the fracture penetrating the water-bearing zone to account for fluid leak-off into the formation. Fracture volume is calculated by multiplying the fracture width by length, by height, by the porosity ore the fracture and taking into account both fracture wings. After pumping the total volume calculated of the polymer solution, injection of the potassium chloride brine is terminated after pumping about fifteen percent (15%) more volume of brine or non-sealing fluid into the oil-bearing zone to clear the perforations and give added assurance of no invasion of polymer solution into the oil-bearing zone in the vicinity of the perforations. At this point, the packer may be released and potassium chloride brine circulated down through the tubing string and up the well annulus to clear the wellbore of the polymer solution. The tubing string may then be pulled uphole and the packer reset above the perforations into the oil-bearing zone so that oil may be produced through the tubing string. Preferably, the well is shut in for twenty-four hours to allow the gel to set before being placed in production.

Although a preferred embodiment of the invention has been described in some detail hereinabove, those skilled in the art will recognize that various substitutions and modifications may be made to the method described without departing from the scope and spirit of the appended claims.

What is claimed is:

1. A method for reducing the production of formation fluid through a first portion of a hydraulic fracture extending within an earth formation without reducing the production of formation fluid through a second portion of said fracture, comprising the steps of:

injecting a first fluid into said first portion of said fracture from a well in communication with said fracture, said first fluid comprising a settable gel composition which forms a semi-solid barrier to substantially prevent production of fluids from said first portion of said fracture into said well; and injecting a second fluid into said second portion of said fracture simultaneously with the injection of said first fluid into said first portion of said fracture, which second fluid is a non-sealing medium such that formation fluids may be produced from said second portion of said fracture into said well while fluid is prevented from production from said first portion of said fracture into said well.

2. The method set forth in claim 1 wherein:
    said first fluid and said second fluid are injected at flow rates which are a function of the ratio of the height of said second portion of said fracture to said first portion of said fracture.

3. The method set forth in claim 1 wherein:
    said first fluid and said second fluid are injected at flow rates which are a function of the ratio of the viscosity of said first fluid to the viscosity of said second fluid.

4. The method set forth in claim 1 wherein:
    at least one of said first fluid and said second fluid is injected at a flow rate which is a function of the difference in the densities of said first fluid and said second fluid, respectively.

5. A method of preventing the production of water from a water-bearing zone of an earth formation which has been hydraulically fractured and wherein a hydraulic fracture extends between a hydrocarbon fluid bearing zone of said earth formation and said water-bearing zone of said earth formation from a well, said method comprising the steps of:

providing for fluid flow communication between said well and said respective portions of said hydraulic fracture which extend into said zones, respectively;

determining the height of said portions of said fracture, respectively;

placing seal means in said well at an interface between said zones and providing separate flow paths through said well in flow communication with first and second portions of said fracture, respectively, which extend in said hydrocarbon fluid bearing zone and said water-bearing zone;

simultaneously injecting a non-sealing fluid into said first portion of said fracture penetrating said hydrocarbon fluid bearing zone and injecting a settable gel composition into said second portion of said fracture penetrating said water-bearing zone of said earth formation to prevent the production of water from said water-bearing zone into said well.

6. The method set forth in claim 5 wherein:
    said fluids are each injected at a rate, such as to substantially prevent invasion of said fluids into the portion of said fracture adjacent the portion of said fracture into which said fluids are injected, respectively.

7. The method set forth in claim 5 wherein:
    said non-sealing fluid is selected from a group consisting of crude oil, diesel fuel and brine.

8. The method set forth in claim 5 wherein:
    said non-sealing fluid includes one of a gel delaying or preventing substance mixed therein.

9. A method for reducing the production of formation fluid through a first portion of a hydraulic fracture extending within an earth formation without reducing the production of formation fluid through a second portion of said fracture, comprising the steps of:

- injecting a first fluid into said first portion of said fracture from a well in communication with said fracture, which fluid will form a seal to substantially prevent production of fluids from said first portion of said fracture into said well;
- injecting a second fluid into said second portion of said fracture simultaneously with the injection of said first fluid into said first portion of said fracture, which second fluid is a non-sealing medium such that formation fluids may be produced from said second portion of said fracture into said well while fluid is prevented from production from said first portion of said fracture into said well; and
- said fluids are injected into said portion of said fracture at volumetric flow rates such as to maintain substantially equal differential pressures across respective banks of said fluids penetrating said fracture.

10. A method for reducing the production of formation water through a first portion of a hydraulic fracture extending within an earth formation into a well penetrating said formation and in communication with said fracture without reducing the production of formation fluid into said well through a second portion of said fracture, comprising the steps of:

- providing a first fluid as a settable gel composition which will form a semi-solid barrier to the production of said water into said well from said first portion of said fracture;
- injecting said first fluid into said first portion of said fracture from said well, which first fluid will form a seal to substantially prevent production of water from said first portion of said fracture into said well; and
- injecting a second fluid into said second portion of said fracture simultaneously with the injection of said first fluid into said first portion of said fracture, which second fluid is a non-sealing medium such that formation fluids may be produced from said second portion of said fracture into said well while water is prevented from production from said first portion of said fracture into said well, said second fluid having mixed therein one of a gel delaying and gel preventing material to prevent sealing said second portion of said fracture upon invasion of said first fluid thereinto.

* * * * *